United States Patent [19]

Heuschen et al.

[11] 4,281,087

[45] Jul. 28, 1981

[54] LACTONE COPOLYMERS, PROCESS FOR THEIR PREPARATION AND COMPOSITIONS CONTAINING THEM

[75] Inventors: Jean Heuschen, Malmedy; Robert Jérôme, Tilff, both of Belgium; Philippe Teyssié, Avenue de Bois de Rognac, 85, B. 4121 Neuville-en-Condroz, Belgium

[73] Assignee: Philippe Teyssié, Neuville-en-Condroz, Belgium

[21] Appl. No.: 66,354

[22] Filed: Aug. 13, 1979

Related U.S. Application Data

[63] Continuation-in-part of Ser. No. 911,025, May 31, 1978, abandoned.

[51] Int. Cl.³ .................. C08L 67/04; C08G 63/10
[52] U.S. Cl. .................... 525/361; 525/63; 525/69; 525/91; 525/365; 525/386
[58] Field of Search ............... 525/361, 386, 63, 69, 525/91, 365, 437

[56] References Cited

U.S. PATENT DOCUMENTS

| | | | |
|---|---|---|---|
| 3,432,445 | 3/1969 | Osgan et al. | 528/92 |
| 3,585,257 | 6/1971 | Mueller et al. | 525/386 |
| 3,598,791 | 8/1971 | Nieuwenhuis et al. | 525/437 |
| 3,789,084 | 1/1974 | Childers et al. | 525/91 |
| 3,855,357 | 12/1974 | Harris et al. | 525/386 |
| 3,897,513 | 7/1975 | Sundet | 525/386 |

*Primary Examiner*—Wilbert J. Briggs, Sr.
*Attorney, Agent, or Firm*—Nestor W. Shust

[57] ABSTRACT

Block and graft lactone copolymers are prepared by reacting a base polymer containing hydroxyl groups with an organometallic catalyst of the formula

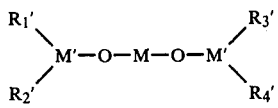

wherein $R_1'$, $R_2'$, $R_3'$, and $R_4'$ are alkoxy groups (alcoholate groups), M' is a trivalent metal and M is a divalent metal, whereby the catalyst becomes bonded to the base polymer by way of the hydroxyl groups. Then the remaining alkoxy groups are converted to acyl groups and thereafter the organometalic end-groups are reacted with a lactone to form the lactone polymer moiety. The resulting block and graft copolymers are particularly useful when blended with other polymers, as for example polyvinyl chloride.

9 Claims, No Drawings

LACTONE COPOLYMERS, PROCESS FOR THEIR PREPARATION AND COMPOSITIONS CONTAINING THEM

This application is a continuation-in-part, of my copending application Ser. No. 911,025 filed May 31, 1978, now abandoned.

BACKGROUND OF THE INVENTION

Lactones, such as ε-caprolactone, form polymers which have the characteristic of being compatible with polymers such as styrene-acrylonitrile, polymethyl methacrylate, vinyl chloride polymers and the like. In order to increase the range of applications of lactone polymers, attempts have been made to prepare copolymers in which the lactone polymer is bonded chemically with another conventional polymer. However, no process is known in the art which would permit the preparation of such copolymers at satisfactory yields and on a large scale.

SUMMARY OF THE INVENTION

The present invention deals with block and graft copolymers which contain one or more blocks of conventional polymers and one or more blocks of a lactone polymer, with a method for preparing such block and graft copolymers and compositions wherein said lactone copolymers are blended with other polymers. Lactone copolymers are obtained by reacting a conventional polymer containing one or more hydroxyl groups with a metal alcoholate catalyst. The resulting intermediate is a base polymer which has one or more metallic alcoholate moieties bonded on the base polymer. When a lactone is reacted with the intermediate the lactone polymerizes forming a polylactone block. The copolymers may contain from 5 to 95 weight percent of the lactone block and correspondingly 5 to 95 weight percent of the base polymer block. When lactone copolymers are blended with other polymers, and especially with polyvinyl chloride, the resulting compositions possess improved physical properties.

DETAILED DISCLOSURE

One feature of the present invention is a process for the preparation of polylactone block and graft copolymers. This process essentially consists of reacting a base polymer which contains hydroxyl groups with an organometallic catalyst of the formula

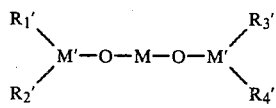

wherein $R'_1$, $R'_2$, $R'_3$ and $R'_4$ are alkoxy groups having 1 to 20 carbon atoms, M' is a trivalent metal and M is a divalent metal, whereby the organometallic group becomes bonded to the base polymer by way of the hydroxyl groups, replacing the remaining alkoxy groups containing 1 to 20 carbon atoms with a group having no catalytic effect on the lactone polymerization and thereafter reacting said base polymer containing organometallic groups with a lactone.

The above noted catalysts are prepared from tetraalkoxy (tetraalcoholate) mixed metal oxide compounds of the formula

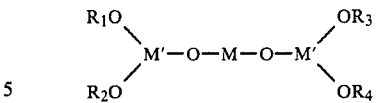

wherein $R_1$, $R_2$, $R_3$ and $R_4$ are alkyl groups of 1 to 20 carbon atoms, and M' and M are as defined above. These mixed metal oxide compounds are known and described in greater detail in U.S. Pat. No. 3,432,445, which disclosure is incorporated herein by reference. Although M' can be any trivalent metal, preferably it is aluminum. Similarly, although M can be any divalent metal, it is preferably zinc. It is also preferable that the alcoholate moiety (the alkoxy group) in the catalyst be derived from a secondary alcohol, that is, that R' of the alkoxy group be branched, as for example isopropyl, isobutyl, isoamyl, isohexyl and the like.

The base polymer with which a lactone may be copolymerized can be any hydroxyl-group containing polymer or any polymer which can be hydroxylated and which does not contain groups that would interfere with the lactone polymerization reaction. The hydroxyl groups on the base polymer may result from the polymerization of appropriate hydroxyl containing monomers or monomers that contain groups that can be converted to hydroxyl functions, such as for example esters. Hydroxyl groups may also be introduced onto some polymers by "hydroxylating" them, as for example polybutadiene or a polybutadiene copolymer. Various hydroxyl containing polymers are disclosed in U.S. Pat. Nos. 3,515,773; 3,551,471; 3,551,472; 3,699,153; 3,712,916 and 3,850,856. Illustrative examples of polymers which may be easily hydroxylated or whose groups may easily be converted to hydroxyl groups are polyolefins such as homopolymers of ethylene, propylene, butene-1, pentene-1, hexene-1, 4-methylpentene and the like and copolymers thereof such as ethylene-propylene copolymers, ethylene-butene-1 copolymers, 4-methyl-1-pentene-hexene-1 copolymer and the like; ethylene-propylene terpolymers where the third monomer is a diene such as 1,4-hexadiene, 2-methyl-1,4-hexadiene, dicyclopentadiene, vinylcyclohexene, vinylnorbornene and the like; polyesters obtained by the condensation of saturated or unsaturated anhydrides or dibasic acids, such as maleic, fumaric, itaconic or terephthalic anhydrides or fumaric, adipic, azaleic, sebacic or isophthalic acids, with a glycol such as propylene glycol, ethylene glycol, diethylene glycol, neopentyl glycol or trimethylpentane diol; polymers derived from conjugated dienes such as polybutadiene, copolymers of butadiene and styrene, acrylonitrile, acrylic acid, alkyl acrylates or methacrylates, methylvinyl ketone, vinyl pyridine and the like, polyisoprene or polychloroprene; homopolymers and copolymers of acrylic monomers, such as acrylic acid, methacrylic acid, methyl acrylate, methyl methacrylate, ethyl acrylate, 2-ethylhexyl acrylate, acrylamide, methacrylamide, N-methylol acrylamide, acrylonitrile, methacrylonitrile or the like; polycarbonates, as well as homopolymers and copolymers of styrene, α-methylstyrene, divinyl benzene, vinyl esters and the like. The copolymers useful in this invention can be statistical, alternate, graft or block copolymers.

The above discussed base polymers employed in the process of this invention to yield block and graft copolymers also of this invention may have any number of hydroxyl groups anywhere along the chain but usually such polymers contain from 1 to 10 hydroxyl groups. Preferably the polymers contain 1 to 2 hydroxyl groups per molecule, the hydroxyl groups being usually terminal. The number of catalyst molecules bonded at the chain-end during the first step of the process of this invention depends on this number. Preferably one mole of the catalyst is employed for each mole of the hydroxyl group in the base polymer so that each hydroxyl group is bonded to an organometallic catalyst moiety. It can be verified that the organometallic moieties constitute the catalytically active sites with regard to subsequent polymerization.

The alkoxy groups containing 1 to 20 carbon atoms remaining after the base polymer is reacted with the catalyst are replaced with groups having no catalytic effect on the polymerization of lactones. This can be accomplished by reacting the intermediate with an organic carboxylic acid such as an aliphatic acid as for example propionic acid, butyric acid, valeric acid, heptoic acid, stearic acid, and the like.

The lactones which may be used to prepare the block and graft copolymers of this invention can be selected from those that are capable of being polymerized in the presence of a catalyst with a metallic alcoholate function. Thus, for example, $\beta$-propiolactone, $\epsilon$-butyrolactone, $\epsilon$-caprolactone, $\epsilon$-valerolactone and their derivatives including substituents such as ethyl and methyl radicals on the carbons of the ring can therefore be used. Within the scope of the invention, nonsubstituted lactones, such as, more specifically, $\epsilon$-caprolactone, are preferred.

The lactone copolymers obtained according to this process therefore consist of polymeric lactone blocks that are attached to the base polymer which contained the terminal OH groups. Depending on whether this polymer has one or two hydroxyls at the chain end, the copolymer can be a diblock or a triblock. However, the invention is not limited to the use of a polymer containing only two hydroxyls at chain ends, because the base polymer can contain more than one hydroxyl at each end and it can also include hydroxyl groups along the backbone which would result in a grafted copolymer.

The copolymerization reaction can occur under all operating conditions, in bulk or in solution, in a solvent which can be, for example, an aliphatic or aromatic hydrocarbon or a chlorinated hydrocarbon, or any other solvent which is not reactive with the catalyst, the polymer and the monomers and does not interfere with the polymerization reaction. Typical useful solvents are pentane, hexane, heptane, octane, and higher alkanes, cyclohexane, cycloheptane and the like, benzene, toluene, xylene, ethylbenzene, chlorobenzene, chlorotoluene, dichlorobenzene, trichlorobenzene, dichlorotoluene, chloroform, carbontetrachloride, dichloroethane, trichloroethane (methylchloroform), tetrachloroethane, chloropropane, dichloropropane, trichloropropane, pentachloropropane, chlorobutane, as well as di, tri, tetra, penta, hexa, and heptachlorobutane and the like.

Conditions of the copolymerization reaction can be controlled at will (e.g. by varying the ratio of the reactants or the temperature) to obtain polymers in which the blocks have the desired molecular weight or a relative proportion of one block to another. Indeed, the process of this invention permits one to benefit from all the classic advantages of living polymerizations with regard to controlling the nature and proportions of the blocks. It also permits one to obtain block and graft copolymers of excellent yields, e.g. 90% yield.

The block or graft copolymer is finally isolated by precipitating with a non-solvent. Although any copolymer non-solvent can be used, lower alkanols such as methanol, ethanol or isopropanol are most practical; methanol being most economical and very efficient for that purpose. The non-solvent should be acidified to hydrolyze the catalyst and thus remove it dissolving the catalyst in the polymer non-solvent and lower alkanols, especially methanol, also serve that purpose well. If the copolymer is precipitated with a non-solvent in which the hydrolyzed catalyst is also insoluble, then a catalyst solvent such as water or alcohol must also be added (regardless of whether it is miscible with the non-solvent or not) to facilitate the removal of the catalyst.

The copolymer of this invention can be represented by the general formula $$Z(L)_n$$

wherein Z is a base polymer block, L is a lactone polymer block, and n is a number of 1 or more. Usually n is 1 to 10 and often 1 or 2.

Another feature of this invention deals with the use of lactone block copolymers as constituents of compositions containing other polymers. More specifically, lactone block copolymers of this invention can be used very advantageously in blends with other thermoplastic compositions especially those based on polyvinyl chloride. Such compositions benefit from the fact that polylactone blocks are particularly compatible with polyvinyl chloride. The lactone copolymers can be blended with one or more polymers listed in the discussion dealing with base polymer or additionally other polymers, such as polyurethanes derived from a glycol such as trimethyl propane glycol, butanediol, or a mixture thereof, or a polyol derived from a polyester, polyether, or derivative of polycaprolactone, with a polyisocyanate such as an aromatic or aliphatic diisocyanate or isocyanate-terminated prepolymer; and polyamides such as polycaprolactam or those obtained by the condensation of hexamethylenediamine with adipic or sebacic acid or the like; vinyl polymers such as polyvinyl chloride, chlorinated polyvinyl chloride, polyvinyl fluoride, polyvinylidene chloride, polyvinyl acetate, copolymers of vinyl chloride with vinylidene chloride, butadiene, styrene, vinyl esters, acrylic or methacrylic acid, or other $\alpha,\beta$-olefinically unsaturated acids and esters thereof such as alkyl acrylates and methacrylates, $\alpha,\beta$-olefinically unsaturated ketones and aldehydes and the like; polycarbonates; epoxy resins such as those obtained by the condensation of epichlorohydrin with bis-phenols and copolymers of ethylene oxide or propylene oxide with epichlorohydrin; and the like polymeric compositions.

Such blend compositions could contain two components, e.g. a polylactone block copolymer and for example polyvinyl chloride or they could have a number of components. A three component blend containing a polylactone block copolymer which contains polylactone blocks and an elastomeric block such as polyisoprene, polybutadiene, cis-polybutadiene, polychloroprene, polypentenamer, polyacrylate, poly(butadiene-acrylonitrile), poly(isoprene-acrylonitrile), poly(styrene-butadiene), poly(isoprene-styrene), poly(ethylene-propylene), poly(ethylene-propylene-diene), and the like; polyvinyl chloride and an elastomeric polymer such as polybutadiene or any other elastomer listed above, are particularly useful compositions because they exhibit excellent shock resistant properties in comparison to polyvinyl chloride or other polymers. In such blends the lactone copolymer is in a dispersed phase in the polyvinyl chloride matrix.

Although the blend compositions could contain from 1 to 99 weight percent of each components, preferably such compositions contain 1 to 20 weight percent of a lactone block copolymer, the non-lactone blocks in said copolymers having preferably a molecular weight of from 10,000 to 200,000. In a two component blend polyvinyl chloride is in the amount of 70 to 99 weight percent. In a three component blend the polylactone block copolymer is in the range of 1 to 20 weight percent, the non-block, non-polyvinyl chloride polymer is in the range of 1 to 50 weight percent and polyvinyl chloride is in the range of 30 to 98 weight percent.

Still another feature of this invention is the use of lactone block copolymers as emulsifying agents in blends including two polymers, one of which is compatible with polylactone, notably polyvinyl chloride (PVC), while the other is normally not compatible with PVC but which is made compatible by the use of a lactone block copolymer. Therefore in this instance the lactone block copolymer acts as a compatibilizer for two normally incompatible polymers. A particularly interesting application on industrial scale concerns the blends of PVC and polystyrene. Rendering these two polymers compatible raises the possibility of recycling of city wastes consisting of plastic material, since these two polymers represent a major proportion of plastic wastes.

However, the invention is not limited to the particular types of thermoplastic compositions just mentioned. It is applicable, in particular, to compatibilizing PVC with any other polymer. Generally speaking, the proportion of the lactone block copolymer in such compositions advantageously ranges from 1 to 20 weight percent. The block copolymers themselves can contain 5 to 95 weight percent of each of the blocks in respective proportions. The total molecular weight of the block copolymer ranges advantageously from 10,000 to 400,000, as stated above. The preferred proportions of each of the blocks in the copolymer are on the order of 40 to 60 weight percent. The two incompatible polymers can be present in all proportions, but most frequently they range from 10 to 90 weight percent of each polymer. The specific proportions depend upon the application for which the mixtures are destined. Of course, such mixtures are not limited to two incompatible polymers since three or four components could also be present.

The block and graft copolymers of lactones themselves constitute products of great commercial interest because of their unexpected mechanical properties. Specifically, they possess an unusually high tensile strength and good low temperature impact resistance. Preferred copolymers of this type contain 40–90 weight percent polylactone, notably polycaprolactone, while the base block is any other polymer listed supra and notably polystyrene or polybutadiene. In this case, the copolymers preferably exhibit a total molecular weight in excess of 30,000. In the case where the copolymer is used to improve the impact resistance of a polymer such as polyvinyl chloride, the copolymer used preferably contains a substantial portion of polycaprolactone, the remaining block being a polymer of elastomeric properties. The reinforcement effect is obtained both in the rigid polymers alone and in their blends with an elastomer.

A polycaprolactone block copolymer in which the base polymer was polybutadiene, polyisoprene or any diene-containing polymer can be hydrogenated to saturate all or part of the ethylenic unsaturation. The resulting block copolymers may be useful per se since they have highly interesting mechanical properties or may be used as an emulsifying agent or a compatibilizer in blends containing one or more polymers which are compatible with polycaprolactone and one or more polymers which are compatible with the hydrogenated block, such as poly-α-olefins.

The different compositions in accordance with the invention can be produced by any of the conventional techniques for mixing and preparing thermoplastics. They can also contain any conventional additives, such as stabilizers, lubricants, colorants, plasticizers, softeners, and the like.

The above described invention is further illustrated by the specific examples below, without intending to introduce any limitations. In the examples, the proportions are expressed in weights except where indicated otherwise.

EXAMPLE I

Preparation Of The Catalyst

A bimetallic oxoalkyloxy catalyst of aluminum and zinc is prepared by the condensation method described in U.S. Pat. No. 3,432,445. To obtain a catalyst with the formula $(RO)_2Al-O-Zn-O-Al(RO)_2$, in which the alkyl radical R is the isopropyl radical, anhydrous zinc acetate is made to react with aluminum isoproppoxide, and the isopropyl acetate that is formed is eliminated by distillation.

Five-hundred ml of dry decalin and 1 mole of aluminum triisopropoxide in solution in one liter of toluene are added to $\frac{1}{2}$ mole of zinc acetate that has been previously dehydrated and vacuum dried ($10^{-4}$ mm Hg). The mixture is brought to 130° C. for two hours under toluene reflux. A gel appears and a mixture of toluene and isopropyl acetate distills slowly. The temperature is then elevated gradually to assure slow distillation of toluene and the ester formed for about four hours. When the gel has disappeared, the catalyst thus formed is maintained at 195° C. for eight hours. The decalin is then removed by distillation in a partial vacuum and subsequently replaced by 100 ml of toluene, which is also distilled. After this washing, the catalyst is stored in a vacuum ($10^{-4}$ mm Hg) for 12 hours.

The catalyst thus obtained is redissolved in toluene. It has an Al/Zn molar ratio of 1.98 and a RO/Al molar ratio of 2.01. The catalyst is subsequently diluted with dry toluene until a concentration of 0.1 M is reached.

EXAMPLE 2

Monohydroxy polystyrene is prepared by anionic polymerization by using sec-butyl lithium in a nonpolar medium (toluene) as an initiator. The butyl lithium is added slowly to a mixture of toluene and styrene preliminarily dried and cooled to 0° C., and containing 10–20 weight percent styrene. Since the polymerization of styrene by this method is of the living type, the proportion of butyl lithium used determines the molecular weight of the polystyrene ultimately obtained.

After 24 hours of polymerization at conventional temperatures, the polymer obtained is deactivated by the addition of ethylene oxide (20 times the stoichiometric quantity) in a 20% solution in benzene to form lithium alcoholate terminations.

The polystyrene obtained is precipitated in methanol and acidified with hydrochloric acid so as to hydrolyze the alcoholate. It is then washed with methanol and vacuum dried at 60° C.

Using a styrene/sec.-butyl lithium molar ratio of 900, a polystyrene with a number-average molecular weight of 90,000 and a functionality of 1 is obtained.

The catalyst prepared according to the procedure of Example 1 is added to a toluene solution of the above prepared monohydroxy polystyrene so as to have a catalyst/hydroxy mole ratio of 1. The reaction mixture is heated to effect the exchange of polystyrene with the isopropoxy groups on the catalyst and the isopropyl alcohol that is formed is eliminated by distillation. A solution of 2-ethylcaproic acid diluted to 0.5 mole in toluene is added dropwise to the above reaction mixture until an amount equivalent to the molarity of the remaining isopropoxide groups is attained. The mixture is heated and the isopropyl alcohol-formed in the reaction is eliminated by distillation.

The polymer carrying the organometallic radicals at chain-ends stemming from the original bimetallic alcoholate is used to induce polymerization of ε-caprolactone. The caprolactone (910 moles per mole of catalytic radical) is first dissolved in a sufficient amount of toluene to result in a lactone concentration of 1 mole/liter. The polymerization mixture is heated at 50° C. for 48 hours.

The copolymer formed is separated by precipitation in methanol acidified by 0.5 weight percent 12 N hydrochloric acid.

The polymerization yield of the lactone is 98%. The copolymer structure is that of a diblock poly (ε-caprolactone-b-styrene) with a molecular weight of 200,000, containing 55% polycaprolactone and 45% polystyrene. The product contained 7.5% of homopolystyrene as determined by extraction technique.

EXAMPLE 3

Polybutadiene monohydroxylated by anionic polymerization of butadiene in solution in benzene is prepared by utilizing sec.-butyl lithium as an initiator, as in Example 2. After two hours at 0° C., the mixture is heated at 50° C. for 16 hours to assure polymerization. After deactivation in ethylene oxide, the hydroxylated polybutadiene obtained is precipitated in methanol acidified with hydrochloric acid to hydrolyze the alcoholate formed and dissolve the lithium salt.

By conducting the synthesis in a vacuum and utilizing a monomer/catalyst molar ratio of 1,100, a hydroxylated polybutadiene with a number-average molecular weight of 60,000 is obtained.

The hydroxylated polybutadiene and 2-ethylcaproic acid are substituted on the catalyst of Example 1 following the procedure of Example 2. The quantitatively released isopropyl alcohol is eliminated by distillation.

Copolymerization with caprolactone is carried out under conditions similar to those of the preceding example. The polybutadiene concentration in the solvent is fixed at 7%. For a monomer/catalyst molar ratio of 720, 68 g of lactone is used for 50 g of monohydroxylated polybutadiene.

114 g of copolymer is obtained, which corresponds to a polyester yield of 97%. The number-average molecular weight of the copolymer is 142,000 for a composition including 58 weight percent polycaprolactone and 42 weight percent of polybutadiene. This copolymer contains a few percent of homopolybutadiene.

EXAMPLE 4

Using the procedure described in the preceding examples, samples of triblock copolymers of polystyrene and polycaprolactone are prepared, in which the polycaprolactone concentration ranges from 40 to 90 weight percent and the number-average molecular weight of the copolymer ranges from 50,000 to 400,000.

The structure of these copolymers corresponds to that of a continuous polycaprolactone phase in which polystyrene microdomains are dispersed.

The study of the mechanical properties of these samples, notably the examination of their behavior in a tensile-elongation test according to ASTM 412 B, and the measurement of their Izod impact resistance according to standard ISO R 180, reveals a reinforcement effect on the polycaprolactone due to the presence of polystyrene.

To illustrate this, a sample of copolymer consisting of 56 weight percent polycaprolactone blocks with a number-average molecular weight of 90,000 and 44 weight percent polystyrene blocks of molecular weight 70,000 (total molecular weight 160,000) has a Young's modulus that is higher than that of polycaprolactone, which forms the continuous phase, and a viscous-elastic behavior up to 160° C. It can be drawn to fibers having a high tensile strength both at ordinary temperatures under tension and in resistance strength at low temperatures. By way of comparison, a polystyrene sample with a molecular weight corresponding to that of the sequences of the copolymer (70,000) is extrememly fragile, and a semi-crystalline polycaprolactone sample (molecular weight 90,000) is totally unsuitable for use at a temperature of 50° C. (viscous flow to melting).

Similar results are obtained with triblock copolymers of polycaprolactone and polybutadiene.

EXAMPLE 5

Triblock copolymers containing from 40 to 60 weight percent of each of the polycaprolactone and polystyrene blocks are prepared in accordance with the preceding examples.

One of these samples consists of 49 weight precent polycaprolactone blocks and 51 weight percent polystyrene blocks, the number-average molecular weights of these blocks being 40,000 and 38,000 respectively. Another sample is a block copolymer containing 56 weight percent polycaprolactone and 44 weight percent polystyrene, the number-average molecular weights of the blocks being 70,000 and 90,000, respectively. These block polymers are incorporated into polymer blends containing polystyrene and more than 60 weight percent polyvinyl chloride (PVC). The PVC used is a product with a number-average molecular weight of 20,000 obtained by radical polymerization of vinyl chloride in emulsion at 80° C. The polystyrene is obtained by anionic polymerization of styrene in the presence of butyl lithium, and it has a molecular weight of 21,000.

To make such ternary blends polystyrene/polycaprolactone block copolymer is added to a mixture containing for example, 66 weight parts PVC and 34 weight parts polystyrene or 80 weight parts PVC and 20 parts polystyrene, in a quantity such that the block copolymer concentration in the final mixture obtained is 10 weight percent.

Test samples are prepared by molding ternary blends at 160° C. under pressure. The examination of their mechanical properties compared with those of the corresponding binary blends (not containing block copolymers) and those of PVC, and particularly, the testing of the tensile elongation behavior in accordance with standard ASTM 638 D, reveal a remarkable improvement obtained by the addition of the copolymer. The qualities of the ternary blends are nearly the same as those of pure PVC. The improvement is particularly evident in the breaking load and breaking elongation.

Similar results are obtained by the addition of the polystyrene-polycaprolactone copolymer having a total molecular weight of 160,000, but utilizing the nonfractionated product which is obtained as a result of copolymerization of the lactone. Said nonfractionated copolymer product is added to a mixture of polystyrene obtained by anionic polymerization and having a molecular weight of 58,000 and PVC having a molecular weight of 43,000 and obtained by radical polymerization in suspension.

Another test shows that similar results are obtained when a mixture of commercial polystyrene and PVC with molecular weights of 200,000 and 100,000 respectively, is prepared with a PVC/polystyrene weight ratio of 80/20, containing 5 weight percent of a block copolymer. The copolymer is prepared in accordance with Example 4, but using polystyrene with a molecular weight of 250,000 and adjusting the respective concentrations of polystyrene and caprolactone so as to obtain a molecular weight of 150,000 for the polycaprolactone block of the copolymer. The respective weight proportions of the copolymer sequences are then about 62 weight percent for polystyrene and 38 weight percent for polycaprolactone.

EXAMPLE 6

A powder mixture of polyvinyl chloride with a number-average molecular weight of 20,000 (weight-average molecular weight, 36,000), 10 weight percent of the mixture being a copolymer prepared in accordance with the preceding examples, having a number-average molecular weight of 78,000 and containing 45 weight percent polycaprolactone blocks and 55 weight percent polystyrene blocks, is prepared. 0.5% zinc stearate and 0.5% calcium stearate as stabilizers of the polyvinyl chloride are added to the mixture and it is molded with a roller kneading machine at 180° C.

The variations in the torsion modulus in samples of the molded product thus obtained are determined as a function of the temperature by means of a Gehman's apparatus in accordance with standard ASTM 1053-58T.

An examination of the curves obtained shows the plasticizing effect of the copolymer with regard to PVC, while it is well known that styrene as a homopolymer is incompatible with PVC. Thanks to the formation of a copolymer block with polycaprolactone, its compatibility with PVC can be assured by the polycaprolactone. In addition, it is remarkable that the samples obtained are transparent. This transparency seems to be due to the excellent dispersion of the polystyrene blocks, since the diameter of the dispersed microdomain is less than 800 angstroms.

If in the above blend, the polyvinyl chloride is replaced by a mixture of 80 weight percent polyvinyl chloride and 20 weight percent polystyrene, transparent samples are also obtained and an examination of the torsion modulus curves results in similar conclusions.

EXAMPLE 7

A block copolymer with a low molecular weight obtaind in accordance with the preceding examples and consisting of polycaprolactone blocks with molecular weight of 68,000 and polybutadiene blocks with a molecular weight of 45,000 is used. 5 weight percent or 10 weight percent of the copolymer is incorporated in polyvinyl chloride and the mixture molded as in Example 6.

Samples of this product are subjected to shock resistance tests in accordance with standard ISO R 180 (Izod impact resistance) and tensile tests according to standard ASTM 412D. The Izod impact resistance, in particular, seems notably improved by comparison with pure PVC. The samples are transparent, the dimensions of the dispersed microdomain remaining smaller than 800 angstroms.

Similar results are obtained by replacing polyvinyl chloride by mixtures of PVC with polybutadiene in proportions ranging from 5 to 50 weight percent.

EXAMPLE 8

Poly(caprolactone-b-butadiene) of Example 3 is hydrogenated by known techniques using a nickel or cobalt catalyst to yield poly(caprolactone-b-ethylene-co-butene) which is then blended with PVC and polyethylene. A tough homogeneous composition is obtained.

We claim:

1. A process for the preparation of lactone block and graft copolymers which comprises
   (a) contacting a base polymer containing one or more hydroxyl groups with a catalyst of the formula

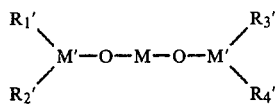

wherein $R_1'$, $R_2'$, $R_3'$ and $R_4'$ are alkoxy groups having 1 to 20 carbon atoms, M' is a trivalent metal and M is a divalent metal, whereby the organometallic group becomes bonded to the base polymer by way of the hydroxyl groups;
   (b) replacing the remaining alkoxy group having 1 to 20 carbon atoms with a group having no catalytic effect on lactone polymerization;
   (c) reacting the resulting intermediate containing organometallic groups with a lactone.

2. A process of claim 1 wherein M' is aluminum and M is zinc.

3. A process of claim 2 wherein the hydroxyl-containing base polymer has 1 to 10 hydroxyl groups per molecule.

4. A process of claim 3 wherein the R' alkoxy groups are derived from a secondary alcohol.

5. A process of claim 4 wherein the R' alkoxy groups are derived from isopropyl alcohol.

6. A process of claim 5 wherein the remaining alkoxy groups are acylated with 2-ethylcaproic acid.

7. A process of claim 5 wherein the lactone is ε-caprolactone.

8. A process of claim 7 wherein the hydroxylated base polymer is a homopolymer or a copolymer of styrene, α-methylstyrene, isoprene, butadiene, an α-monoolefin, an acrylate or methacrylate, acrylonitrile or a vinyl ester.

9. A process of claim 7 wherein the base polymer has 1 to 2 terminal OH groups per molecule.

* * * * *